United States Patent
Alsenz

(10) Patent No.: US 6,857,287 B1
(45) Date of Patent: Feb. 22, 2005

(54) REFRIGERATION CYCLE

(75) Inventor: Richard Herman Alsenz, Houston, TX (US)

(73) Assignee: Altech Controls Corporation, Missouri City, TX (US)

( * ) Notice: Subject to any disclaimer, the term of this patent is extended or adjusted under 35 U.S.C. 154(b) by 231 days.

(21) Appl. No.: 09/663,231

(22) Filed: Sep. 15, 2000

Related U.S. Application Data

(60) Provisional application No. 60/168,335, filed on Dec. 1, 1999, and provisional application No. 60/154,027, filed on Sep. 16, 1999.

(51) Int. Cl.[7] ............................................. F25B 39/04
(52) U.S. Cl. ........................................ 62/509; 62/45.1
(58) Field of Search ........................... 62/509, 115, 45.1

(56) References Cited

U.S. PATENT DOCUMENTS

| | | | | |
|---|---|---|---|---|
| 2,628,478 A | * | 2/1953 | Zearfoss, Jr. | ................ 62/509 |
| 2,817,218 A | * | 12/1957 | Beckwith | .................... 62/45.1 |
| 2,889,953 A | * | 6/1959 | Morrison | ................. 62/45.1 X |
| 3,050,951 A | * | 8/1962 | Gebien | ........................ 62/45.1 |
| 3,993,213 A | * | 11/1976 | Burge et al. | ............. 62/45.1 X |
| 4,014,182 A | * | 3/1977 | Granryd | .................... 62/196.2 |
| 4,773,234 A | * | 9/1988 | Kann | ........................ 62/509 X |
| 4,862,702 A | * | 9/1989 | O'Neal | ...................... 62/196.4 |
| 6,170,272 B1 | * | 1/2001 | Backman | .................. 62/509 X |

* cited by examiner

*Primary Examiner*—Harry B. Tanner

(57) ABSTRACT

A refrigeration process comprising: compressing low pressure vapor refrigerant to a higher temperature and pressure vapor, compressing low pressure vapor refrigerant to a higher temperature and pressure vapor, condensing the higher pressure vapor refrigerant into a liquid refrigerant at the higher pressure, thermally isolating the higher pressure liquid, cooling the thermally isolated liquid refrigerant while remaining thermally isolated and then allowing thermal contact of the remaining low temperature and pressure liquid and a cooled substance causing the low temperature and pressure liquid to further reversibly boil to a vapor at the low pressure.

6 Claims, 1 Drawing Sheet

REFRIGERATION CYCLE

Figure 1:
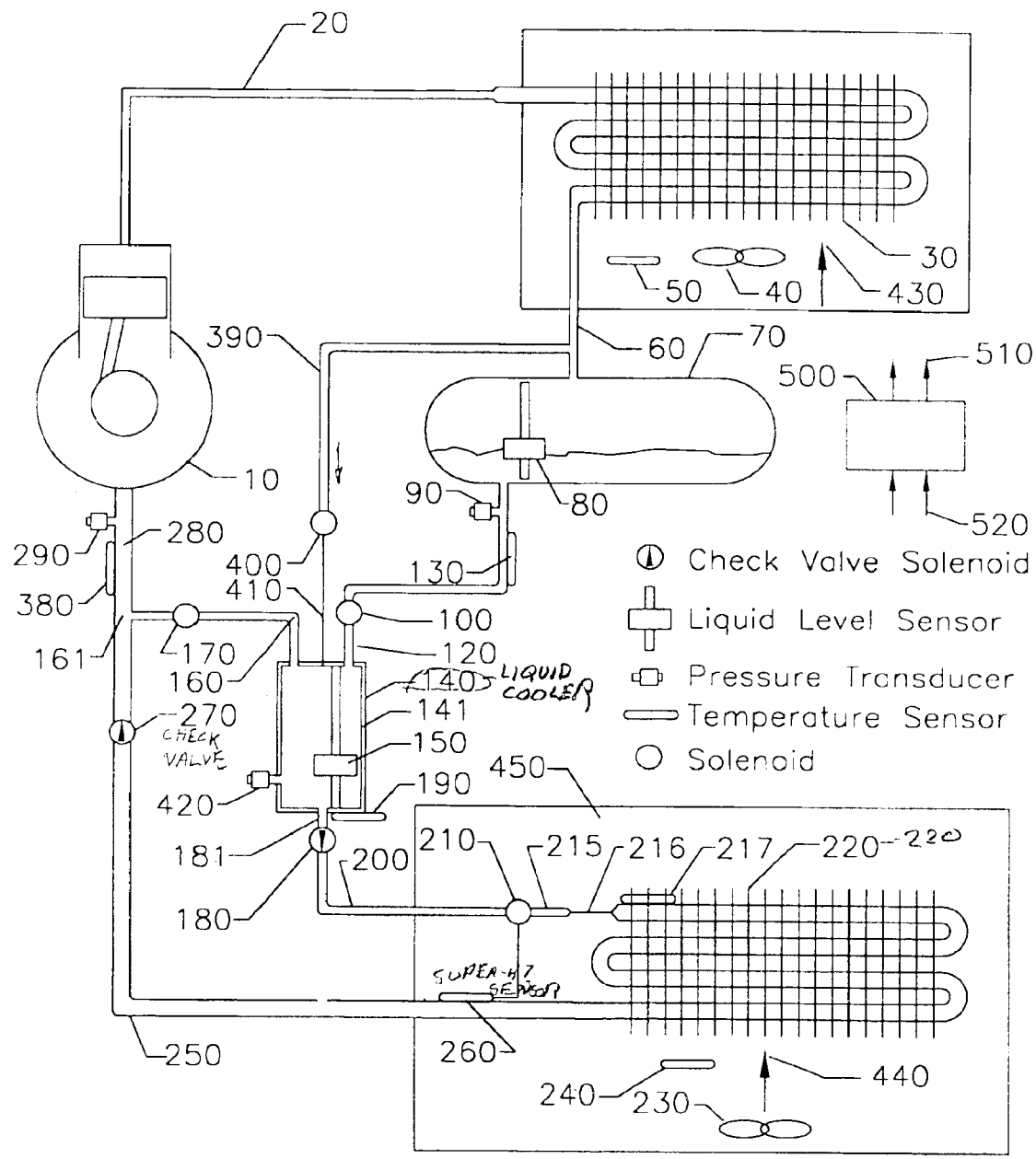

This application claims the benefit of the following U.S. Provisional Patent Applications: Ser. No. 60/154,027, filed Sep. 16, 1999, and Ser. No. 60/168,335 filed Dec. 1, 1999.

BACKGROUND OF THE INVENTION

1. Field of the Invention

This invention pertains to a novel liquid vapor refrigeration cycle which evaporates the liquid leaving the condenser by thermally isolating the liquid from energy loss during the evaporative cooling of the liquid as it is cooled below the condensing temperature. This allows a refrigerator to achieve efficiency greater than has been achieved in the past, and as a result of its greater efficiency it is also possible to achieve lower temperatures than before.

2. Description of the Related Art

Most prior art liquid-vapor refrigerant systems have attempted to eliminate the energy wasted during expansion of the liquid across an expansion valve by incorporating expansion engines, or have attempted to continuously remove the energy in the warm condensate liquid with an auxiliary refrigeration system which is continuously operating at a higher coefficient of performance. The expansion engines have the disadvantage that the expanded refrigerant must then be recompressed by the compressor at a lower COP (coefficient of performance). Mechanically sub-cooled systems have the added disadvantage that they have losses due to expansion valves and the heat exchanger.

U.S. Pat. No. 3,766,745 by inventor Lester K. Quick describes an invention that overcomes the need for a heat exchange to cool the warm liquid at a better COP (coefficient of performance). However, U.S. Pat. No. 3,766,745 still has the major disadvantage of prior art systems of irreversible free expansion into a tank and at the expansion valves, which causes the major inefficiency in the Quick invention and all other liquid vapor prior art systems. U.S. Pat. No. 3,766,745 also utilizes expansion valves at the evaporators, which also result in the irreversible free expansion of the refrigerant. This system allows energy exchange from the liquid being expanded and the liquid and gas molecules which have gone through the expansion. This means that the potential energy which is in the liquid is wasted by accelerating molecules randomly. This is a consequence of the liquid not being thermally isolated during the expansion process.

U.S. Pat. No. 4,014,182 by inventor Eric Granryd describes an invention, which contains an evaporator, a condenser, a compressor and a closed vessel which receives condensed refrigerant from the condenser. The vessel has outlets connected to the compressor and to the evaporator. Communication between the vessel and the compressor is established for a regulated period to lower the pressure in the vessel, causing the refrigerant therein to boil and cool. During most of this period, communication between the evaporator and the compressor is closed and thereafter is opened. This patent uses a batch process to cool the warm refrigerant.

U.S. Pat. No. 4,014,182 does address the problem of irreversibility at the expansion valve and offers a solution which, however, introduces several other irreversibilities, and hence inefficiencies, into the system that have not been previously recognized. One of the irreversibilities introduced by Granryd comes about in the vessel, which contains the evaporating refrigerant. The refrigerant is placed in the vessel and refrigerated. As it cools, it also cools the walls of the vessel. When the cool liquid is ejected and the next batch of warm liquid is placed into the vessel, the vessel is at a low temperature and the energy from the warm liquid flows from the refrigerant into the walls. Thus, the previous liquid cooling cycle was used to remove part of the energy in the injected warm liquid refrigerant at a lower COP than would be possible if the transfer of energy from the vessel walls had not taken place. Since the cost of removing the energy at the end of the cycle is the greatest, this means that the portion of the cycle, which would benefit the most from this approach, is actually costing the most. Also, some of the vapor from the condenser condenses on the cool walls of the vessel, which actually adds more heat load to the refrigeration system; this is also an additional irreversible process. Thus, if appreciable energy exchange is allowed to take place between the liquid and the cooling vessel surroundings, the process is made more irreversible and thus more inefficient. It is therefore, important to minimize the relative amount of energy which is transferred in and out of the liquid before, during, and after the liquid cooling process, as is disclosed in the present invention.

In the current invention the liquid is allowed to expand reversibly by evaporative cooling in a container from which the liquid is thermally isolated. The cool liquid is then delivered to the evaporator for cooling the cooled substance without the need of an expansion throttling valve, or the pressure reducing device of U.S. Pat. No. 3,766,745, or the heat exchangers used in sub-cooling systems.

Thermally isolative cooling process is the process of minimizing energy flow from the condensate liquid during the period which it is cooled in a cooling vessel. This means that the amount of energy flowing to or from the liquid as the result of contact with its surroundings, per unit mass of refrigerant circulated, should be small during this process in order to obtain a high efficiency.

The problem of losing energy from the liquid when it enters the liquid cooling container because the cooler is cold from the previous cycle was not recognized by Granryd in U.S. Pat. No. 4,014,182. Neither was the problem of vapor entering the cooling vessel from the condenser and condensing on the cool walls of the cooling vessel, thereby adding energy to the cycle and causing the compressor to remove more energy than a conventional refrigeration cycle. Therefore, the solution of providing a thermally isolated inner surface for the liquid cooling container, which would isolate the liquid thermally from the cooling vessel and limit the energy exchanged with the liquid, was not proposed by Granryd. Granryd did propose the use of insulation on the tank but did not teach the use of thermal isolation of the liquid within the container, i.e., the liquid has to be thermally isolated against the flow of energy to or from the cooling vessel during the reversible process of evaporation. If it is not thermally isolated the process will not be reversible and, thus, be more inefficient.

One embodiment of the current invention solves the problems presented by the Granryd patent by replacing the liquid cooling vessel with a container, which thermally isolates the liquid refrigerant from its surroundings during the liquid cooling process. This eliminates the irreversible free expansion that has taken place in most prior art systems and replaces it with a reversible expansion process, which achieves a larger efficiency. It also eliminates the irreversible transfer of energy from the liquid to the surroundings by thermally isolating the liquid from the container by using a thermally non-conducting liner. Irreversible expansion which was present in U.S. Pat. No. 4,014,182 due to the thermal conduction between the vessel used to expand the refrigerant and the refrigerant is eliminated in the current invention. The current invention also eliminates the problem in U.S. Pat. No. 4,014,182 of vapor condensation on the cool walls of the cooling vessel, which took place during part of the cycle.

Tests on a system constructed in accordance with U.S. Pat. No. 4,014,182 indicate that the operational cost of a system constructed in this way will exceed the cost of operation of a conventional refrigeration system which is equipped with an expansion valve. This could explain why such a system has not achieved commercial success in the 22 years since the issuance of U.S. Pat. No. 4,014,182. The current invention demonstrates the solution to a long felt need by discovering and solving the problems of inefficiency in refrigeration systems, which have gone unrecognized for those 22 years.

The current invention also solves the problem of moving the liquid from the condenser to the liquid cooling container and then to the evaporator. This problem was not recognized previously, and therefore, no solutions exist to this problem in the prior art.

Finally, the problem of irreversibility at the expansion valve in a liquid vapor system has not been solved successfully prior to this invention. A common attempt in the past to overcome the inefficiency due to the irreversible nature of the expansion through the expansion valve has been to utilize the energy that is lost by running an engine with the wasted energy. The solution utilized in the current invention offers greater efficiency than can be achieved by the expansion engine solution because it is a more reversible process, because the use of an expansion engine still requires that the gas used for expansion must still be compressed by the compressor. This means that the inefficiency of the engine is magnified by inefficiency of the compressor resulting in an efficiency less than the current invention.

BRIEF DESCRIPTION OF THE DRAWING FIGURES

FIG. 1 is a schematic of refrigeration system deploying adiabatic cooling of the liquid refrigerant. ..\Drawings\Novel Refrigeration Cycle.cdr

SUMMARY OF THE INVENTION

The current invention is a refrigeration process which utilizes a reversible adiabatic liquid cooling process. This is done by eliminating the free expansion at the expansion valve in a closed loop liquid vapor system, and replaces it with a thermally isolative cooling process which is the process of minimizing energy flow from the condensate liquid during the period which it is cooled in a cooling vessel.

Table of Numbers

| Number | Description |
|---|---|
| 10 | Compressor |
| 20 | Discharge line from compressor |
| 30 | condenser |
| 40 | Condenser fan |
| 50 | Condenser air temperature sensor |
| 60 | Line connecting condenser and receiver |
| 70 | Receiver (liquid reservoir) |
| 80 | Liquid level sensor in the receiver |
| 90 | Pressure transducer on the liquid tube leaving the receiver |

Table of Numbers -continued

| Number | Description |
|---|---|
| 100 | Solenoid valve on the liquid tube leaving the receiver |
| 120 | Supply tube to liquid cooler |
| 130 | Liquid tube temperature sensor |
| 140 | Liquid cooler container |
| 141 | Thermally isolating Inner liner of liquid cooler container |
| 150 | Liquid level sensor in the liquid cooler |
| 160 | Tube connecting suction solenoid 170 and liquid cooler container 140 |
| 161 | Tube connecting suction solenoid 170 and suction tube 280 |
| 170 | Suction solenoid for liquid cooler container |
| 180 | Solenoid check valve leaving the liquid cooler |
| 181 | Liquid tube leaving the liquid cooler |
| 190 | Temperature sensor on the liquid cooler |
| 200 | Liquid tube connecting liquid cooler to evaporator metering valve |
| 210 | Liquid metering valve |
| 215 | Tube connecting evaporator metering valve and evaporator |
| 216 | Liquid metering tube |
| 217 | evaporator inlet temperature sensor |
| 220 | Evaporator |
| 230 | Evaporator fan |
| 240 | Refrigerator air temperature sensor |
| 260 | Evaporator outlet temperature |
| 270 | Suction 1 way valve from evaporator |
| 280 | Suction tube |
| 290 | Suction pressure transducer |
| 380 | Suction temperature transducer |
| 390 | Tube from high pressure to supply solenoid 400 |
| 400 | Liquid cooler container pressurization feed line solenoid |
| 410 | Liquid cooler container pressurization feed line |
| 420 | Pressure transducer for liquid cooler container |
| 430 | Air passing over the condenser |
| 440 | Refrigerator air circulated over the evaporator |
| 450 | Refrigerated area |
| 500 | Micro-processor controller |
| 510 | Micro-processor controller outputs |
| 520 | Micro-processor controller inputs |

Table of Elements

| | |
|---|---|
| Compressor | 10 |
| Condenser | 30 |
| Liquid cooler container Pressurization | |
| Liquid cooler Liquid level sensor | 150 |
| Means for filling liquid cooler | 500, 510, 520, 150 |
| Pressurization means | 410, 400, 390, 170, 100, |
| Receiver liquid level sensor | 80 |
| Thermally isolative cooling container | 140 |
| Thermally isolative liner | 141 |

Objectives and Advantages

Table of Functions, purposes, objectives, goals, tasks

| Objectives | Solution |
|---|---|
| Save Energy By achieving adiabatic expansion in a refrigeration system 140, 141 | Thermally isolate the condensate liquid during cooling (expansion) of condensate liquid Contain Thermally isolated liquid during cooling of the liquid |
| Save additional energy 500, 510, 520, 230 | turn off fans during the liquid cooling phase of adiabatic expansion |

-continued

Table of Functions, purposes, objectives, goals, tasks

| Objectives | Solution |
|---|---|
| Achieve lower temperatures in a refrigeration system by achieving adiabatic expansion 140, 141 | Contain thermally isolated liquid during cooling of the liquid |
| Achieve lower temperatures in a refrigeration system by achieving adiabatic expansion 140, 141 | turn off fans during the liquid cooling phase of adiabatic expansion |

DESCRIPTION OF THE PREFERRED EMBODIMENTS

FIG. 1 is a schematic of a refrigeration system operating with a single compressor and single evaporator which utilizes one embodiment of the current invention of the reversible adiabatic liquid cooling process. This is done by introducing a control system and a separate thermal isolated vessel within which the liquid is evaporatively cooled, and from which the liquid is thermally isolated, thus eliminating the major portion of the irreversible free expansion at the expansion valve in a closed loop liquid vapor system. The process implemented and controlled by a micro-controller 500 with inputs 520 taken from transducers and outputs 510 used to operate motors, solenoids and other output type functions. Multiple or mixed refrigerants may be used without deviating from the invention.

Compressing: In FIG. 1 micro-controller 500 turns on compressor 10 through outputs 510 which compresses low pressure vapor entering from vapor tube 280 to a high pressure vapor and transmits it to the condenser 30 through high pressure vapor tube 20. Temperature sensor 380 and pressure sensor 380 provide information to micro-controller 500 through inputs 520. Micro-controller 500 turns off compressor 10 when the pressure at pressure transducer 290 or the temperature at temperature transducer 240 falls below preset values or determines that liquid exists at temperature probe 380 or pressure transducer 290. Various types of compressors may be added in parallel or series without deviating from the invention.

Condensing: The high temperature and pressure vapor is cooled and condensed in condenser 30 by the circulation of cooler ambient air by a fan 40. Temperature sensors 50, 130 and pressure sensors 90 and 290 are used to provide the temperature and pressure information to micro-controller 500 through inputs 520. The pressure at pressure transducer 90 is maintained by micro-controller 500 at a pressure 20 psi greater than the pressure at pressure transducer 290 by increasing the speed of fan 40 if the pressure differential is greater than 20 psi and decreasing the speed if the pressure differential is less than 20 psi. The liquid condensed by condenser 30 is transmitted through tube 60 to a liquid receiver tank 70. A liquid level sensor 80 supplies information to inputs 520 of micro-controller 500 which determines the amount of liquid in receiver tank 70. Liquid tubes and 120, 90, and solenoid valve 100 are used to transport liquid from receiver tank 70 to the liquid cooling container 140 which thermally isolates the liquid with a thermally non-conductive inner liner 141.

Thermally Isolative cooling process: One of the novel and key features of this invention is the reversible expansion of the condensed liquid. Reversible expansion is the evaporation of the liquid with minimal transfer of energy between the surroundings and the liquid or the vapor to which the liquid is being expanded. The micro-controller 500 checks the pressure in liquid cooler 140 and in the receiver 70 to determine whether the pressure is lower in the liquid cooler by comparing the difference in pressure transducers 90 and 420. If the liquid cooler is not at a pressure lower than in the receiver, the pressure in the cooler is lowered by momentarily opening valve 170. When it is determined that the pressure in the liquid cooler is lower than in the receiver, liquid is transferred into the liquid cooling container 140 in a reversible way (i.e., without the transfer of energy to or from the liquid), through open solenoid valve 100 and liquid tubes 90 and 120 until such time as the level reaches a preset level detected by liquid level switch 150. The liquid cooling container 140 contains a thermo-isolative inner lining 141 which prevents energy transfer from the liquid to or from the walls of the liquid cooling container 140. Valves 180, 170 and 400 remain closed until the preset level is reached. When micro-controller 500 determines the preset level is reached, the liquid cooling phase begins which allows the energy to be removed from the liquid at the highest COP (coefficient of performance) possible by evaporating the thermally isolated liquid. Valves 180 and 100 are closed and valve 170 is opened by the outputs 520 of micro-controller 500 allowing suction of compressor 10 on the liquid cooling container 140, which results in evaporation of the liquid at a rapid rate. Valve 400 remains closed by micro-controller 500 and vapor is passed from tube 160 through valve 170, and through tube 161 to tube 280, and then to the suction side of compressor 10. At this point, check valve 270 becomes reverse biased and does not pass vapor from tube 250 into tube 280.

Since the liquid cooling container 140 has a thermo-isolative liner 141 on its inside walls, neither the liquid cooling container nor the thermo-isolative liner 141 give up or take in appreciable energy as the container 140 receives liquid which is alternately heated and cooled by the process. This allows the liquid to be expanded in a manner, which is more reversible than described in U.S. Pat. No. 4,014,182. Multiple containers with thermo-isolative liners may be used to expand the liquid, which would allow the continuous supply of liquid to evaporators. The inventor is also defining the term thermo-isolative to mean that only small amounts of energy are transferred.

In this embodiment the liquid is being thermally isolated from its surroundings by providing a thermo-isolative lining inside the liquid cooling container. It is also possible to incorporate the invention in other embodiments, which will only transfer small amounts of energy from the liquid to its surroundings during the cooling of the liquid. This is accomplished by thermally isolating the liquid by isolating means and the scope of this invention is intended to cover the methods of transferring minimal amounts of energy to and from the liquid or resulting vapor during the cooling of the liquid. In another embodiment the entire liquid cooling container 140 would be made out of a material of low thermal conductivity, such as epoxy. Yet another possible embodiment would be to create a vapor barrier between a thin conductive lining and the vessel.

In another embodiment the thermally isolative cooling process may also be done by decreasing the time in which the liquid is cooled. If the liquid is in contact with the surface of a container for only a short amount of time, then the amount of energy lost to the container could be small per unit of refrigerant mass circulated, and would satisfy the inventor's definition of a thermo-isolative process.

In another embodiment the thermally isolative cooling process may be done by a separate evaporative system which would indirectly cool the liquid with a heat exchanger. This system would be designed to transfer only a small amount of energy to or from the liquid and the separate heat exchanger or other heat exchange mediums at times other than when the liquid is cooled. Although a system practicing the current invention with a separate evaporator and system would not have the efficiency of the first embodiment described, it would be a considerable improvement over prior art systems. These systems would fall under the inventor's definition of "thermally isolating the liquid during the liquid cooling phase".

Compressing the liquid from the liquid cooling container 140: Compressor 10 may be of constant speed or of the variable speed type. Under variable speed operation, the speed may be initially reduced by micro-controller 500 since the volumetric efficiency is greatly increased during the first part of the liquid cooling cycle, and then increased toward the end of the cooling cycle. Alternatively, the compressor speed my be set by micro-controller 500 through one of the outputs 510 to achieve the maximum power, such that it is controlled to slower speeds when the liquid cooling cycle is first started and faster speeds as the liquid cooling cycle approaches the temperature of evaporator 220. It is also possible to achieve a similar benefit by using unloaders to reduce the load on a compressor during the first part of the cycle. This would achieve a further benefit of not overloading the compressor during the period which low compression ratios are present on the compressor.

Transfer of Liquid to the cooling evaporator: When micro-controller 500 determines that the pressure and temperature of the liquid in the liquid cooling container 140 approach either a preset point, or the temperature and pressure of evaporator cooling coil 220 the cool liquid is transferred into evaporator cooling coil 220. This is accomplished by pressurizing container 140 with high pressure vapor from the high pressure receive tank 70. Micro-controller 500 opens valve 400 and high pressure vapor travels through tube 390, valve 400 and restricted tube 410. Tube 410 is restricted since it is not desirable to have pressurization by large volumes of vapor, which would increase the amount of condensing in liquid cooling container 140 during this phase of the cycle. The cold liquid is then transferred through tube 181, valve 180, tube 200, metering valve 210, tube 215, and restriction tube 216 into cooling evaporator 220. Receivers tanks before and/or after the liquid cooler container 140 may also be used to even the flow from the condenser and to the evaporator.

Evaporate liquid in cooling evaporator: Micro-controller 500 allows the liquid to enter evaporator coil 220 through metering valve 210 until the amount of liquid is sufficient to provide cooling at a low pressure/low temperature in order to cool the ambient air 440 circulated by fan 230 which is also controlled by micro-controller 500. It is at this point that all prior art systems have incorporated free irreversible expansion by expanding the liquid at a high pressure and or temperature through an expansion valve. The current invention minimizes this loss by expanding the liquid in a reversible manner rather than the irreversible free expansion across an expansion valve. Temperature sensor 260 is used by micro-controller 500 to determine the degree of superheat leaving evaporator cooling coil 220. If the superheat decreases at the outlet of evaporator cooling coil 220 towards zero, micro-controller 500, through metering valve 210, decreases the amount of liquid flowing into the evaporator cooling coil 220. Conversely, if the superheat increases above a desirable value, metering valve 210 increases the amount of liquid flowing into the evaporator. Fan 230 may be cycled off during the liquid cooling phase if a single compressor is being used to compress the refrigerant from the liquid cooler and the evaporator. Fan 230 may also be cycled off when the temperature is adequate and the compressor is cycled off. The cycling of fan 230 saves energy by initially not consuming the energy and also by not having to remove that energy from the system cooled by the evaporator. It should be noted that multiple evaporators may be added in parallel or series. It is possible in some embodiments that the cooling evaporator function is done by the liquid cooler, i.e., the substance being cooled is brought into thermal contact with the liquid in the liquid cooler after the liquid has been cooled.

Compress vapor from the cooling evaporator: During the filling of the liquid cooling container 140 check valve 270 is forward biased and compressor 10 is receiving gas refrigerant through tube 250 from evaporator cooling coil 220 and compressing it into line 20. During the liquid cooling phase in the liquid cooling container 140 the check valve 270 is reverse biased and there is no flow through tube 250 because the pressure in tube 280 is above the pressure in tube 250. During the evaporator cooling phase, check valve 270 is also forward biased and compressor 10 receives vapor from the evaporator coil 220.

It should be obvious to someone skilled in the art that multiple evaporators may be used to refrigerate in different areas. It should also be obvious to someone skilled in the art that the invention may have more than one compressor and that the compressors may be piped in a way that allows independent suction and compression of the evaporation from the liquid cooling container 140 and the evaporators cooling coil.

What is claimed is:

1. A refrigeration system comprising:
    at least one compressor for compressing a low pressure vapor refrigerant into a higher temperature and pressure vapor refrigerant,
    at least one condenser for condensing the higher pressure vapor refrigerant into a liquid refrigerant at the higher pressure,
    at least one liquid cooling vessel from which the liquid refrigerant is thermally isolated for cooling the liquid refrigerant, with minimal transfer of energy to and/or from the vessel, to a lower temperature to form a cooled liquid refrigerant, and
    at least one evaporator for allowing thermal contact of the cooled liquid refrigerant and a substance to cool the substrate,
    where the lower temperature is a preset point or a temperature of an evaporator cooling coil of the evaporator.

2. The system as described in claim 1, wherein the at least one liquid cooling vessel includes an inner surface having a low thermal conductivity and adapted to minimize energy transfer between the liquid refrigerant and the vessel.

3. The system as described in claim 2, wherein the inner surface is an inner liner.

4. The system as described in claim 2, wherein the vessel is composed of a material having a low thermal conductivity.

5. A liquid condensate cooling process comprising the steps of:
    condensing a vapor refrigerant into a liquid refrigerant;
    thermally isolating the liquid refrigerant from its liquid cooling container;
    changing a portion of the liquid refrigerant to a vapor under adiabatic conditions to cool the liquid refrigerant to a lower temperature to form a cooled liquid refrigerant, transferring the cooled liquid refrigerant to a thermal conductor, and converting the cooled liquid refrigerant into the vapor to provide cooling to a substance, where the lower temperature is a preset point or a temperature of an evaporator cooling coil of the evaporator.

6. A refrigeration process comprising the steps of:

compressing a low pressure vapor refrigerant to a higher temperature and pressure vapor refrigerant;

condensing the higher pressure vapor refrigerant into a liquid refrigerant at the higher pressure;

thermally isolating the liquid refrigerant from its liquid cooling container;

adiabatically evaporating a portion of the liquid refrigerant in the container, while maintaining thermal isolation of the liquid, to cool the liquid refrigerant to a lower temperature to form a cooled liquid refrigerant;

transferring the cooled liquid refrigerant to an evaporator; and converting the cooled liquid refrigerant into the low pressure vapor to provide cooling to a substance, where the lower temperature is a preset point or a temperature of an evaporator cooling coil of the evaporator.

* * * * *